United States Patent
Spreng et al.

(10) Patent No.: US 6,753,669 B2
(45) Date of Patent: Jun. 22, 2004

(54) METHOD FOR CONTROLLING THE DISPLACEMENT OF A PART, DISPLACED BY AN ELECTROMOTOR, OF A CLOSURE DEVICE IN A MOTOR VEHICLE

(75) Inventors: Klaus Spreng, Ingolstadt (DE); Erich Liepold, Koesching (DE)

(73) Assignee: Conti Temic microelectronic GmbH, Nuremberg (DE)

(*) Notice: Subject to any disclaimer, the term of this patent is extended or adjusted under 35 U.S.C. 154(b) by 44 days.

(21) Appl. No.: 10/220,086
(22) PCT Filed: Jun. 2, 2001
(86) PCT No.: PCT/EP01/06308
§ 371 (c)(1), (2), (4) Date: Aug. 26, 2002
(87) PCT Pub. No.: WO01/99252
PCT Pub. Date: Dec. 27, 2001

(65) Prior Publication Data
US 2003/0006728 A1 Jan. 9, 2003

(30) Foreign Application Priority Data
Jun. 14, 2000 (DE) .......................... 100 28 445

(51) Int. Cl.⁷ .......................... E05F 15/14; H02H 7/085
(52) U.S. Cl. ........................ 318/469; 318/286
(58) Field of Search .................. 318/264, 265, 318/266, 286, 466, 468, 469

(56) References Cited
U.S. PATENT DOCUMENTS 5,422,551 A 6/1995 Takeda et al.
5,525,876 A * 6/1996 Filippi .......................... 318/282
5,734,245 A * 3/1998 Terashima et al. ........... 318/453
5,932,931 A * 8/1999 Tanaka et al. .............. 307/10.1
6,086,177 A 7/2000 Driendl et al.
6,100,658 A * 8/2000 Kume et al. ................. 318/286
6,208,102 B1 * 3/2001 Kikuchi et al. .............. 318/466
6,236,176 B1 5/2001 Uebelein et al.

FOREIGN PATENT DOCUMENTS

| DE | 3111684 | 10/1982 |
| DE | 4020351 | 5/1992 |
| DE | 4316898 | 12/1993 |
| DE | 19710338 | 9/1998 |
| DE | 19745597 | 4/1999 |
| DE | 19756616 | 7/1999 |
| WO | WO 98/40945 | 9/1998 |

* cited by examiner

Primary Examiner—Bentsu Ro
(74) Attorney, Agent, or Firm—W. F. Fasse; W. G. Fasse

(57) ABSTRACT

The displacement of a part e.g. window driven by an electromotor in a vehicle is controlled. A jam is identified by comparing a status value (e.g. current or speed) of the electromotor or the closure device with a characteristic value indicating a jam. The position of e.g. the part is detected. The displacement is controlled based on the identification of a jam and the position of the part. If a jam is indicated, the electromotor is stopped for a short time or is reversed. It is determined whether the position of the part has altered or is altering before and/or after the indicated jam. If so, the closing motion is continued, if not, it is assumed that a jam has occurred and the electromotor is reversed. The stopping or reversing time period is so short to be imperceptible to the naked eye.

11 Claims, 1 Drawing Sheet

METHOD FOR CONTROLLING THE DISPLACEMENT OF A PART, DISPLACED BY AN ELECTROMOTOR, OF A CLOSURE DEVICE IN A MOTOR VEHICLE

FIELD OF INVENTION

The invention relates to a method for controlling the displacement motion of a part of a closure device that is driven by an electric motor in a motor vehicle.

BACKGROUND INFORMATION

Such methods are known from German Patent Publications DE 40 20 351 C2 and DE 197 45 597 A1. For recognizing a jamming incident at least one status value of the electric motor and/or of the closure device is compared with a characteristic value that defines a jamming incident. Status values for this purpose are, for example, the displacement force, the motor current, the r.p.m. or the torque moment of the motor. One could also think of detecting the positional change of the closure device or the speed thereof. The jamming incident is then defined by respective characteristic values, for example, a maximum displacement force, a maximum motor current, a minimum r.p.m. and so forth.

OBJECT OF THE INVENTION

In this context, due to external influences, particularly the closing of vehicle doors and of other movable body parts, forces may be effective on the closure device, which forces oppose the displacement motion. Thus, the status values reach the characteristic values, if the forces have a corresponding strength, for a jamming incident thereby causing an emergency shut-off. The shut-off is characterized by a reversing, that is, an instantaneous opposite power supply to the motor which leads to an unmistakable backward motion of the moving part, frequently even into the completely open position thereof. While this cannot be avoided in an actual jamming incident for the protection of possibly pinched-in persons or body parts, a consumer could interpret this usually complete reversal as a failure function in the case that external influences caused the reaching of the comparing results which indicate a jamming incident.

Thus, German Patent Publication DE 40 20 351 C2 suggests sensing the acceleration forces acting on the vehicle body by a sensor and to take these forces into account as a base level. However, a detailed embodiment is not disclosed. If one takes into account the strength and dynamic of the acceleration forces acting on a vehicle body, it remains questionable whether and how such taking into account is technically realizable in a suitable manner.

On the other hand, German Patent Publication 197 45 597 A1 suggests controlling the displacement force of the motor as a sum of a force necessary for the displacement of the part and an adjustable excess force, whereby the displacement force and/or the excess force are controlled in closed loop fashion in response to the forces acting on the vehicle body. Even if one disregards the unclear determination of the force necessary for the displacement of the part and the effort and expense for an exact closed loop control of the displacement forces of the motor, the effort and expense for taking the external forces into account has proven itself to be substantial.

Alternatively, a variation of the displacement and/or excess force is controlled in closed loop fashion in response to opening and closing procedures of movable body parts in that the position of the movable body parts is ascertained by sensors and a variation. Particularly opening and closing procedures are recognized. In such a case an increase of the excess force or even discontinuing the pinching-in protection is suggested. Thus, however the pinching-in danger is put-up with. Additionally, this requires that the control device receives a signal from the sensors regarding the position change even prior to the occurrence of a pinching-in recognition.

Thus, it is an object of the invention to provide an alternative method for controlling the displacement motion of closure device, which method makes possible, on the one hand, a reliable and early recognition of a jamming incident and which, on the other hand, takes into account in a simple manner external influences by movable vehicle body parts.

SUMMARY OF THE INVENTION

The above object has been achieved by the present method for controlling a displacement motion of a movable part of a closure device in a motor vehicle. According to the invention the present method is characterized by the following steps:

(a) driving said movable part by an electric motor, (b) determining at least one characteristic value that is significant for a jamming incident of said movable part, (c) sensing at least one status value of at least one of said electric motor and said closure device wherein said at least one status value is also significant for said jamming incident, (d) comparing said at least one status value with said at least one characteristic value for providing a jamming recognition signal, (e) sensing a first position of at least one movable vehicle body member (e.g. door) to provide a first position signal, (f) processing said jamming recognition signal and said position signal to provide a control signal, (g) stopping said electric motor in response to said control signal for a predetermined length of stopping time ($T_{Stop}$), wherein said predetermined length of stopping time ($T_{Stop}$) begins at a beginning time ($t_x$) when a jamming incident starts, (h) determining, starting with said first position signal, whether a position change is taking place or has taken place within a predetermined time range ($t_x \pm \Delta T$) prior to or after the occurrence of said jamming recognition signal to provide a second position signal indicating a position change, (i) continuing a displacement motion of said movable part in response to said second position signal, or (j) assuming in the absence of said second position signal, the presence of a jamming incident and reversing said electric motor.

Thus, when a comparing result indicates that a jamming incident exists, the electric motor is stopped for a predetermined, short time duration, or alternatively, it is reversed. Thereby it is examined whether, within a given time range prior to and/or after the occurrence of a comparing result indicating a jamming incident and starting from a predetermined first position of the vehicle body part, a change of the position occurred and/or is occurring.

If within this time range the position signal indicates a change relative to the first position of a vehicle body part, the displacement motion in the closing direction is continued, otherwise a jamming incident is assumed to exist and the electric motor is reversed and/or the reversing is continued.

Thereby, the time duration may be determined corresponding to the reaction time of the sensor and the traveling time of the position signal up to the control to be so short that the customer does not notice this pause or the short time reversing during this time duration or at least it is not noticed as a disturbance. Particularly, time durations of about 150 to 100 msec or even shorter have been found to be sufficient to distinguish, by monitoring the sensors, between an actual jamming incident and an occurrence of comparable force caused by the closing of a vehicle body part, particularly the door. If one takes into account that the moved part including the mechanical components first have a substantial inertia and thus hardly come to an actual stop within a time duration of about 100 msec even if a reversing current is applied and additionally the time duration is too short with regard to the receptivity of the human eye, it becomes clear, that the customer will not notice even a reversing introduced for a short duration. On the other hand, the short duration stopping or the reversing have a critically higher safety in case of an actual jamming incident compared to the known alternatives of the prior art of a threshold increase or even a deactivation of the jamming protection.

A first further embodiment of the method is provided when a comparing result indicating a jamming incident and the first position of the vehicle body part are present simultaneously wherein first the electric motor is stopped or reversed again for the predetermined time duration and wherein the displacement motion is continued provided that within this time duration the position signal indicates a change of a vehicle body part relative to the first position. Thus, the case is covered in which the position signal arrives with such a delay, for example due to a slow data transmission, that the recognition has already responded in the case of respectively strong shock vibrations.

A second further development of the method is results, if starting from the given first position, a change of the position of the vehicle body part is recognized and if within a predetermined time range starting with this change, a comparing result occurs indicating a jamming incident. In this case the electric motor is also stopped for the predetermined time duration and the displacement motion is then continued, whereby the time duration of this stop does not need to be identical to that of the first further development, preferably it is clearly shorter. This further development thus covers the case wherein an already recognized door closing operation is immediately followed by a jamming incident.

The characteristic values for comparing with the status values which are significant for a jamming of a part, are adapted at a first position, particularly at an open position of a vehicle body part in a direction of a timewise later jamming recognition. An adaptation in the direction of a timewise later jamming recognition means for example an increase of the jamming characteristic value of the motor current or a reduction of the characteristic value of the r.p.m. and/or the displacement speed. Besides that, the characteristic values can be adapted for the comparing with the status values that are significant for the jamming of a part in response to the position and the motion direction of the movable part.

In a preferred manner the jamming recognition thus remains basically in an active state even after the end of the time duration of the stopping or of the reversing, if indicated, with relatively high characteristic values, so that a jamming incident occurring actually simultaneously with the closing of a door, is recognized even if the displacement is continued and a respective emergency shut-off is initiated.

The invention shall be explained in more detail in the following with reference to an example embodiment and the Figures.

DETAILED DESCRIPTION OF PREFERRED EXAMPLE EMBODIMENTS AND OF THE BEST MODE OF THE INVENTION

Figure 1:
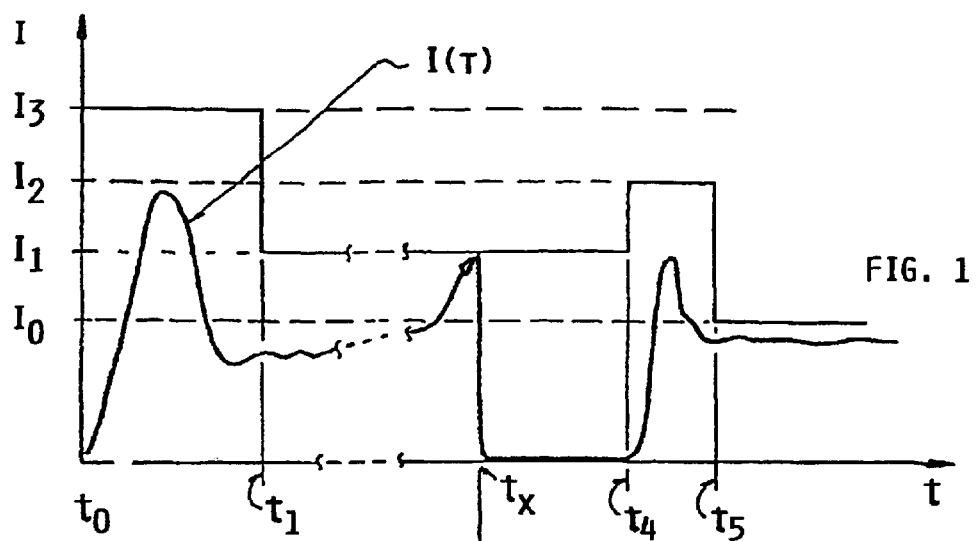
FIG. 1 shows the sequence of the method and the curve of the motor current and of the jamming current characteristic value when the position of the door is changed.

FIG. 1 shows the curve of the motor current I(t) of the electric motor as a status value that is significant for a jamming. In an analog manner other status values can also be used, as explained above, for example the displacement speed of the closure device. The motor current I(t) is compared with the jamming current characteristic value, which, in the especially preferred embodiment of FIG. 1, assumes the values 10, 11, 12 or 13, whereby the selection of the value takes place in response to certain occurrences and will be explained in more detail below.

Figure 2:
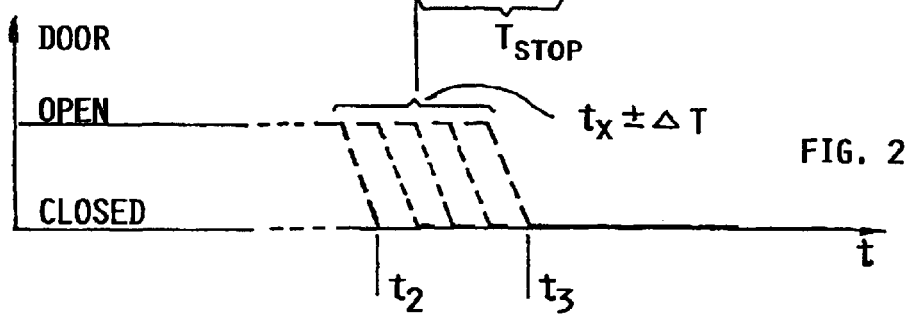
FIG. 2 shows the door position sensor signal.

FIG. 2 shows the position signal of a sensor which senses the position of a movable vehicle body part, in this case a door. The sensor in this example is a door switch with the signal states door open or door closed. For faults in the jamming recognition the vibration shock when closing the door is thereby especially of interest.

When a comparing result in $t_x$ indicating a jamming incident is present, the electric motor is stopped for a predetermined time duration $T_{Stop}$ and the motor current I(t) drops. It is checked whether within a predetermined time range $t_x \pm \Delta T$ prior to and/or after the occurrence of the comparing result that indicates the jamming incident, and starting from a given first position, in this case "door open", of the vehicle body part, a change in the position (door=>closed) has occurred or is occurring. In this case the displacement motion is continued as is shown at $t_4$ in FIG. 1. Otherwise, a jamming incident is assumed and the electric motor is reversed.

The observation of the time range $t_x \pm \Delta T$ prior to and/or after the occurrence of the jamming incident at $t_x$, takes into account the connection of the position sensor to the control system which connection may quite differ in the different systems. Thus, when a direct connection, for example of the door switch to the door control device which is responsive for the displacement control of the window panes, the signal, the position change can be actually evaluated even prior to the recognition of the jamming incident which was caused by vibration shock and thus is not real. However, if the door switch is interrogated through a central CAN-bus, it is possible, until the arrival of the information regarding the position change, that the jamming incident caused by vibration shock has already been recognized. Also in this case an erroneous reversing can be avoided by the stop for the predetermined time duration $T_{Stop}$ when an immediately preceding closing of the door is recognized without the need for cancelling the jamming protection.

The length and orientation of the time range ($t_x \pm \Delta T$ may, but does not need to, lie prior to or after the occurrence of the jamming incident at $t_x$. Particularly, this time range does not need to be symmetrical relative to the jamming point of time $t_x$. By way of this time interval the following are taken into account: the delayed propagation of a vibration shock in response to a position change of a vehicle body part, which propagation must be individually adapted for each vehicle type, the delay in the response of the jamming recognition, and the travel time of the position signal.

If one can start with the assumption that the position change always takes place after the response of the jamming recognition, a first further development of the method results. Thereby, the electric motor is Stopped again for the predetermined time duration $T_{Stop}$ if the comparing result (i(t)=11), that indicates the presence of a jamming incident, and the first position of the vehicle body part (door open) at $t_x$ are present simultaneously, and the displacement motion is continued if within this time duration the position signal indicates a change relative to the first position of a vehicle body part. The time range to be considered and shown in FIG. 1 as ($t_x \pm \Delta T$) then corresponds to $T_{Stop}$. In that case a position change is expected only starting at $t_x$. In a simple example embodiment this means that the position of the doors of the vehicle is monitored and that the electric motor is first Stopped for a predetermined time duration if the comparing result, which indicates a jamming incident, and the position signal, which indicates an open door, are present simultaneously. Then the displacement motion is continued if within this time duration a door closing is indicated.

A second further development of the method is obtained in the reverse case when the position change can always be recognized prior to the response of the jamming recognition. If, starting from the predetermined first position (door open) a change in the position of the vehicle body part is recognized and if a comparing result indicating a jamming incident occurs within a predetermined time range, starting with this change, the electric motor is also Stopped in this case for the predetermined time duration and the displacement motion is then continued. Thereby, the time duration of this Stop does not need to be identical to that of the first further embodiment, preferably it is clearly shorter.

The length of the time duration $T_{Stop}$ is thereby selected to be relatively short and takes into account, above all, the signal travel time and the decay of the vibration shock. Experiments have shown that the time duration for $T_{Stop}$ of about 100 msec and below are sufficient for this purpose. In the most advantageous case the part to be moved thereby does not at all come to a full Stop. This short interruption, in any case, is not noted by the customer or at least it is not noted as being disturbing.

A multitude of possibilities are available for the renewed start-up required for continuing the displacement motion, in order to avoid or limit the danger of jamming also in this instance. The renewed start-up causes a higher start-up current, however, this higher start-up current exceeds, between $t_4$ and $t_5$, the low thresholds 10 or 11 that are customary for the jamming recognition, only for such a short time that the pane has not moved at all in this time range or it has made only such insignificant advance that a jamming cannot occur.

Further, the characteristic values for comparing with the status values that are significant for a jamming of the part, can be adapted by taking into account the position and motion direction of the movable part. This takes place, for example, in this example embodiment, in that first between $t_0$ and $t_1$ the start-up of the pane in the inner area of the door, where there is no danger of jamming, is compared with a high threshold 13. Starting with $t_1$ a switch to a clearly lower threshold 11 is performed, whereby threshold 11 is somewhat higher than threshold 10. Namely, an open position of a vehicle body part is present, in this case of the door, so that in this especially preferred embodiment the characteristic values for comparing with the status values, that are significant for a jamming of the part, are adapted in the direction toward a timewise later jamming recognition, that is: they are increased from 10 to 11, in order to neutralize smaller vibration shocks already in this manner.

For the renewed start-up at $t_4$ the characteristic value is temporarily increased to the threshold 12, which however can be selected to be smaller than 13. Starting with $t_5$, preferably even before the actual beginning of the continuation of the displacement motion of the pane, the characteristic value is also switched to the lowest threshold 10, because the door is now closed.

Especially preferred is the use of the method known from German Patent Publication DE 197 10 388 A1 of the applicant, wherein in each phase including the start-up phase, a jamming can be recognized at any time, so that especially also during a renewed start-up a jamming is certainly recognized.

Figure 3:
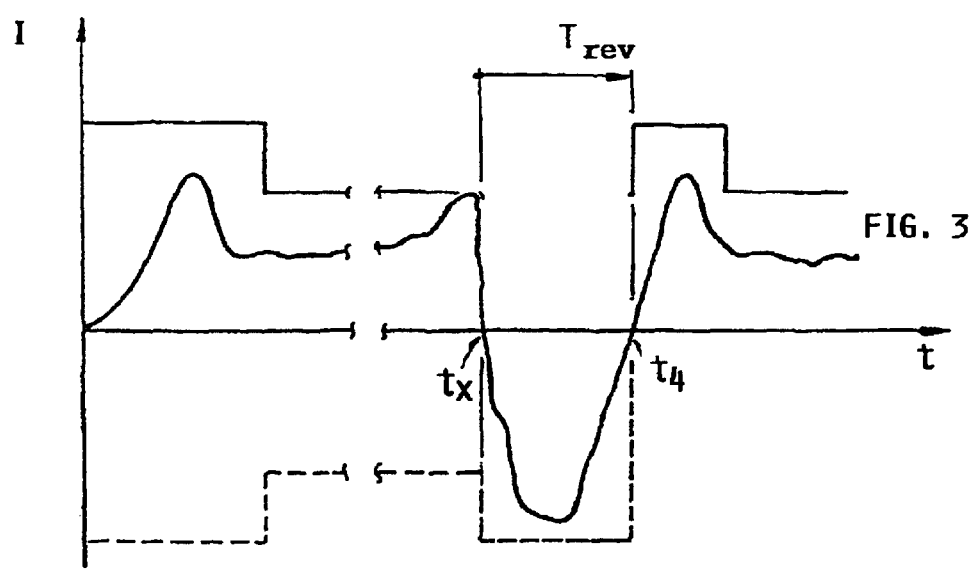
FIG. 3 shows the sequence of the method with a short duration reversing.

FIG. 3 still illustrates the alternative embodiment wherein, when a comparing result is present indicating a jamming incident, the electric motor is even reversed for a time duration $T_{rev}$, that is, the motor is energized in the opposite direction. Thus, the motor current in FIG. 3 becomes substantially negative. Thereby it is again tested, in an analog manner, at the door sensor, whether in the predetermined time range $t_x \pm \Delta T$ prior to and/or after the occurrence of the comparing result indicating the jamming incident and starting from a predetermined first position, in this case "door open", of the vehicle body part, a position change has taken place (door=>closed) or is taking place. In this case the displacement motion is again continued in the closing direction as also seen at $t_4$ in FIG. 3. Otherwise a jamming incident is assumed and reversing of the electric motor is continued.

Figure 4:
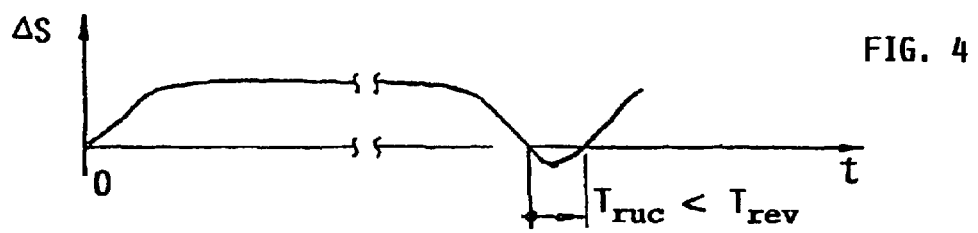
FIG. 4 shows the motion change of the moved part per time unit during the method.

FIG. 4 thereby additionally sketches the actual motion change of the part being moved per unit of time during this method, particularly during the reversing according to FIG. 3, and it makes clear that the actual reverse motion of the part being moved also during reversing is so small and of such short duration due to the inertia of the mechanical system that the customer will not be able to notice this with the naked eye. This is a fact for time durations of 100 msec solely due to the limits of perception. If one additionally takes into account the ratio of the time duration $T_{rev}$ of the reverse energizing to the time duration $T_{ruc}$ of the actually backwards directed motion of the moved part, it becomes clear, that time durations clearly above 100 msec would still be sufficient to assure that the reverse motion is not perceptible for the customer's naked eye. The limits will differ from one system to the other. One can start from the assumption that even a reverse energizing or a Stopping in the range of one second is hardly noticeable on the actual motion change of the pane.

A further alternative not shown in the Figures results form the combination of the two alternatives of reversing and stopping in a timely sequence, that is, one first energizes reversed for a short duration, for example in order to actually and quickly bring the moved part to a Stop, to which subsequently is added a Stop phase, that is a phase without an energizing current, provided a position change of the vehicle body part has not yet been recognized at that time. An actually opposite sequence is also possible.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for controlling a displacement motion of a movable part of a closure device in a motor vehicle, said method comprising the following steps:
   (a) driving said movable part by an electric motor,
   (b) determining at least one characteristic value that is significant for a jamming incident of said movable part,
   (c) sensing at least one status value of at least one of said electric motor and said closure device wherein said at least one status value is also significant for said jamming incident,
   (d) comparing said at least one status value with said at least one characteristic value for providing a jamming recognition signal,
   (e) sensing a first position of at least one movable vehicle body member (e.g. door) to provide a first position signal,
   (f) processing said jamming recognition signal and said position signal to provide a control signal,
   (g) stopping said electric motor in response to said control signal for a predetermined length of stopping time ($T_{Stop}$), wherein said predetermined length of stopping time ($T_{Stop}$) begins at a beginning time ($t_x$) when a jamming incident starts,
   (h) determining, starting with said first position signal, whether a position change is taking place or has taken place within a predetermined time range ($t_x \pm \Delta T$) prior to or after the occurrence of said jamming recognition signal to provide a second position signal indicating a position change,
   (i) continuing a displacement motion of said movable part in response to said second position signal, or
   (j) assuming in the absence of said second position signal, the presence of a jamming incident and reversing said electric motor.

2. The method of claim 1, further comprising the steps of
   (a) checking whether said first position signal indicates at $t_x$ said vehicle body member in an open position (door open at $t_x$) and whether said jamming recognition signal and said first position signal are present simultaneously, if so:
   (b) the electric motor is first stopped for the predetermined length of stopping time ($T_{Stop}$), or it is reversed, then
   (c) checking whether within this predetermined length of stopping time ($T_{Stop}$) said second position signal occurs, if so:
   (d) continuing the displacement motion of said movable part in the closing direction, and if not
   (e) assuming a jamming incident and reversing the electric motor.

3. The method of claim 2, wherein said vehicle body member is at least one door, said method further comprising the steps of:
   (a) monitoring whether said at least one door is open to produce said first position signal as a "door open" signal,
   (b) checking whether said jamming recognition signal and said "door open" signal are present simultaneously, and if so (c) first stopping said electric motor for said predetermined length of stopping time ($T_{Stop}$),
   (d) checking whether within said predetermined length of stopping time ($T_{Stop}$) a door closing takes place, and if so
   (e) continuing said displacement motion.

4. The method of claim 1, further comprising the steps of:
   (a) checking whether and when said second position signal occurs,
   (b) checking whether, within a predetermined time interval starting with the occurrence of said second position signal, said jamming recognition signal occurs;
   (c) stopping said electric motor for said predetermined length of stopping time ($T_{Stop}$) and then resuming said displacement motion.

5. The method of claim 1, further comprising the steps of
   (a) determining a plurality of characteristic values significant for a jamming incident,
   (b) checking whether said at least one vehicle body member is open, and if so
   (c) adapting said plurality of characteristic values relative to a timewise later jamming recognition signal so that an adapted characteristic value is larger than a preceding characteristic value (11>10).

6. The method of claim 1, further comprising
   (a) determining a plurality of characteristic values significant for a jamming incident,
   (b) sensing a current position of said movable part of said closure device to provide a current third position signal,
   (c) sensing a motion direction of said movable part of said closure device to provide a motion direction signal, and
   (d) adapting said characteristic values in their size in response to said current third position signal and in response to said motion direction signal.

7. The method of claim 1, further comprising determining said predetermined length of stopping time ($T_{Stop}$) so short that a motion of said movable part, as it is being moved in a motion direction opposite to a preceding motion direction, cannot be perceived by a naked eye.

8. The method of claim 7, comprising determining said predetermined length of stopping time $T_{(Stop)}$ to be less than 150 msec.

9. The method of claim 8, comprising determining said predetermined length of stopping time ($T_{Stop}$) to be less than 100 msec.

10. The method of claim 1, further comprising
    (a) first reversing said electric motor in response to the presence of said jamming recognition signal for a predetermined length of reversing time ($T_{rev}$), and then
    (b) stopping said electric motor for said predetermined length of stopping time ($T_{Stop}$).

11. The method of claim 1, further comprising
    (a) first stopping said electric motor in response to the presence of said jamming recognition signal for said predetermined length of stopping time ($T_{Stop}$), and then
    (b) reversing said electrical motor for a predetermined length of reversing time ($T_{rev}$).

* * * * *

UNITED STATES PATENT AND TRADEMARK OFFICE
CERTIFICATE OF CORRECTION

PATENT NO. : 6,753,669 B2  Page 1 of 1
DATED : June 22, 2004
INVENTOR(S) : Spreng et al.

It is certified that error appears in the above-identified patent and that said Letters Patent is hereby corrected as shown below:

Column 2,
Between lines 9 and 10, insert the following heading:
-- OBJECT OF THE INVENTION --.

Column 6,
Line 16, after "Publication", replace "DE 197 10 388 A1" by -- DE 197 10 338 A1 --.

Signed and Sealed this

Thirtieth Day of November, 2004

JON W. DUDAS
*Director of the United States Patent and Trademark Office*